United States Patent [19]

Nagasawa et al.

[11] Patent Number: 5,283,700
[45] Date of Patent: Feb. 1, 1994

[54] DIGITAL SIGNAL RECORDING/REPRODUCING APPARATUS FOR RECORDING AND/OR REPRODUCING MAIN INFORMATION ALONG WITH ADDITIONAL INFORMATION

[75] Inventors: Kenichi Nagasawa; Koji Takahashi, both of Kanagawa, Japan

[73] Assignee: Canon Kabushiki Kaisha, Tokyo, Japan

[21] Appl. No.: 657,431

[22] Filed: Feb. 19, 1991

[30] Foreign Application Priority Data

Feb. 20, 1990 [JP] Japan .................................. 2-40226

[51] Int. Cl.$^5$ ......................... G11B 27/36; G11B 5/09
[52] U.S. Cl. ....................................... 360/31; 360/51; 360/48
[58] Field of Search ................ 360/31, 51, 43, 48; 360/32; 369/32, 48, 49; 375/95, 116, 120

[56] References Cited

U.S. PATENT DOCUMENTS

| | | | |
|---|---|---|---|
| 4,791,497 | 12/1988 | Nakano et al. | 360/32 |
| 4,807,055 | 2/1989 | Tsunoda et al. | 360/48 X |
| 4,858,035 | 8/1989 | Hikawa | 360/51 |
| 5,130,863 | 7/1992 | Yamashita et al. | 360/51 X |

*Primary Examiner*—Robert J. Pascal
*Assistant Examiner*—Ali Neyzari
*Attorney, Agent, or Firm*—Robin, Blecker, Daley & Driscoll

[57] ABSTRACT

A recording apparatus for selectively recording, on a recording medium, a plurality of kinds of digital main information signals having different data rates is arranged to generate a digital additional information signal related to the recorded digital main information signal, to record the additional information signal on the recording medium along with the digital main information signal, and to obtain a clock signal for the operation of an additional information generating circuit by frequency-dividing one of different clock signals used for main information generating circuits. The arrangement requires only one additional information generating circuit to minimize the scale of circuit arrangement for reduction in size and weight of the recording apparatus. A reproducing apparatus for reproducing digital main information signals from a recording medium on which the digital main information signals of different data rates are selectively recorded together with the digital additional information signal related thereto is arranged to generate a clock signal for an additional information processing circuit for reproducing the digital additional information signal by frequency-dividing one of clock signals applied to main information processing circuits for processing digital main information signals reproduced. The size and weight of the apparatus can be reduced as the circuit arrangement requires only one additional information processing circuit.

17 Claims, 3 Drawing Sheets

DIGITAL SIGNAL RECORDING/REPRODUCING APPARATUS FOR RECORDING AND/OR REPRODUCING MAIN INFORMATION ALONG WITH ADDITIONAL INFORMATION

BACKGROUND OF THE INVENTION

1. Field of the Invention

This invention relates to a digital signal recording/reproducing apparatus and more particularly to a digital signal recording/reproducing apparatus capable of recording and/or reproducing, along with additional information, a plurality of kinds of digital main information having different data rates from each other.

2. Description of the Related Art

The apparatuses of the kind reproducing records from tape-shaped recording media by means of rotary heads have recently come to include a digital audio tape recorder (abbreviated to DAT), a digital data recorder (DDR), etc., in addition to the video tape recorder (VTR) which is well known. As a result, it has become necessary to arrange the VTR to have some function that is compatible with such various apparatuses.

Such being the background situation, a device for recording, in addition to the conventional analog audio signal, a digital audio signal on an extended part of a video recording track in a time-base compressed state has been developed for the VTR and is now being marketed.

The recording format of the digital audio signal varies with necessary specifications for recording. In other words, since the data rate of the data to be recorded varies according to the necessary specifications, the recording format also varies accordingly. It is, therefore, desirable that the digital audio signal is arranged to be recordable in accordance with any of the audio signal recording formats of varied kinds by the same apparatus (or VTR) while the video signal recording format is arranged to be unvaried.

Generally, in designing a VTR to be capable of recording audio signals in any of various audio signal recording formats, the VTR must be provided with different digital audio signal processing circuits for different data rates respectively. Further, in cases where it is necessary to permit retrieval of the digital audio signal or to have the like function, the VTR must be provided with processing circuits arranged to generate a retrieval signal as additional information and to extract and reproduce the retrieval signal for each of the various recording formats. It is conceivable to process this additional information (or retrieval signal) by the same processing circuit provided for processing the digital audio signal. Generally, however, the additional information to be added for retrieval is preferably recorded and reproduced at a low bit rate for the purpose of facilitating the extracting action thereon.

Therefore, for arranging the VTR to be capable of complying with the audio signal recording formats of varied kinds, the VTR must be provided with processing circuits for processing the audio signals for the various formats and also with processing circuits for processing the retrieval additional information for the various formats. Such arrangement would result in a great increase in the circuit scale of the VTR.

SUMMARY OF THE INVENTION

It is, therefore, a general object of this invention to provide a digital signal recording/reproducing apparatus arranged to solve the above-stated problem.

It is a more specific object of the invention to provide a digital signal recording/reproducing apparatus which is capable of recording and/or reproducing a plurality of kinds of digital main information having different data rates from each other and yet is arranged to have a compact circuit scale for reduction in size and cost thereof.

Under this object, a digital signal recording apparatus arranged as an embodiment of this invention comprises a plurality of main information generating circuits for generating a plurality of kinds of digital main information signals having different data rates from each other; recording means for selectively recording the plurality of kinds of digital main information signals on a recording medium; an additional information generating circuit for generating a digital additional information signal concerned with the digital main information signal selectively recorded by the recording means, the digital additional information signal being arranged to be recorded on the recording medium by the recording means along with the selected digital main information signal; a plurality of clock signal generating circuits for respectively generating a plurality of kinds of clock signals to be used for the plurality of main information generating circuits; and frequency dividing means for generating a clock signal to be used for the additional information generating circuit by frequency-dividing one of the plurality of kinds of clock signals.

A reproducing apparatus arranged according to this invention to reproduce, from a recording medium on which a plurality of kinds of digital main information signals having different data rates from each other are selectively recorded and on which a digital additional information signal concerned with the recorded digital main information signal is recorded, the digital main information signals, comprises reproducing means for reproducing the digital main information signals from the recording medium; a plurality of main information processing circuits arranged to receive signals reproduced by the reproducing means and to process the plurality of kinds of digital main information signals respectively; an additional information processing circuit arranged to receive the signals reproduced by the reproducing means and to process the digital additional information signal; a plurality of clock signal generating circuits for respectively generating a plurality of kinds of clock signals to be used for the plurality of main information processing circuits; and frequency dividing means for generating a clock signal to be used for the additional information processing circuit by frequency-dividing one of the plurality of kinds of clock signals.

The above and other objects and features of the invention will become apparent from the following detailed description of an embodiment thereof taken in conjunction with the accompanying drawings.

DETAILED DESCRIPTION OF THE PREFERRED EMBODIMENT

Figure 1:
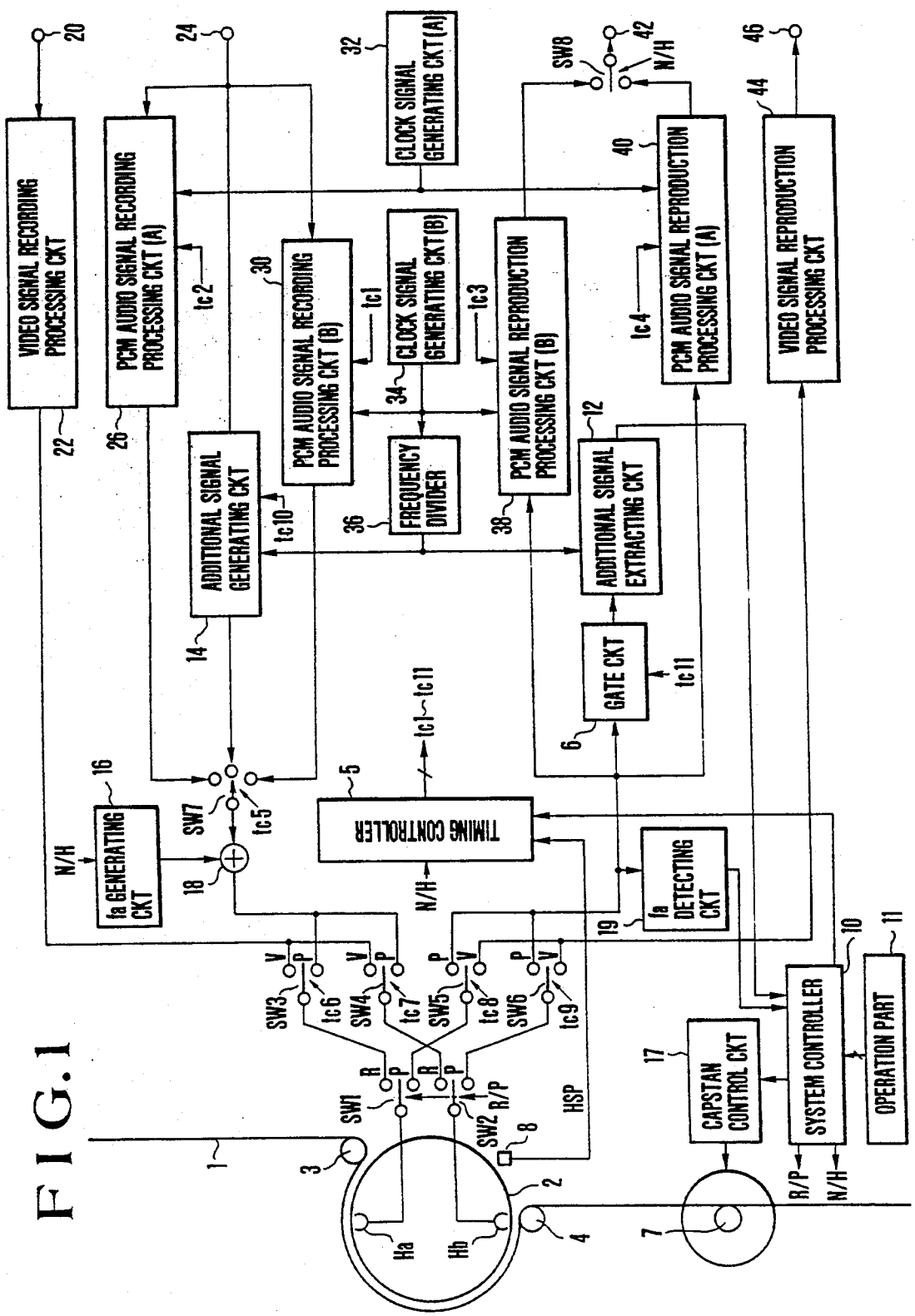
FIG. 1 is a block diagram showing the arrangement of a VTR which is arranged as an embodiment of this invention.

An embodiment of this invention is arranged as described below:

FIG. 1 shows in a block diagram the arrangement of a VTR which embodies the invention. Referring to FIG. 1, the illustration includes a magnetic tape 1; a rotary drum 2 which has rotary heads Ha and Hb mounted on the outer circumferential face thereof; tape loading pins 3 and 4; a capstan 7; a rotation phase detector 8 which is arranged to detect the rotation phase of the drum 2 and to generate a head change-over reference signal (hereinafter referred to as signal HSP); a system controller 10 which is arranged to control each part of the VTR; and an operation part 11.

Figure 2:
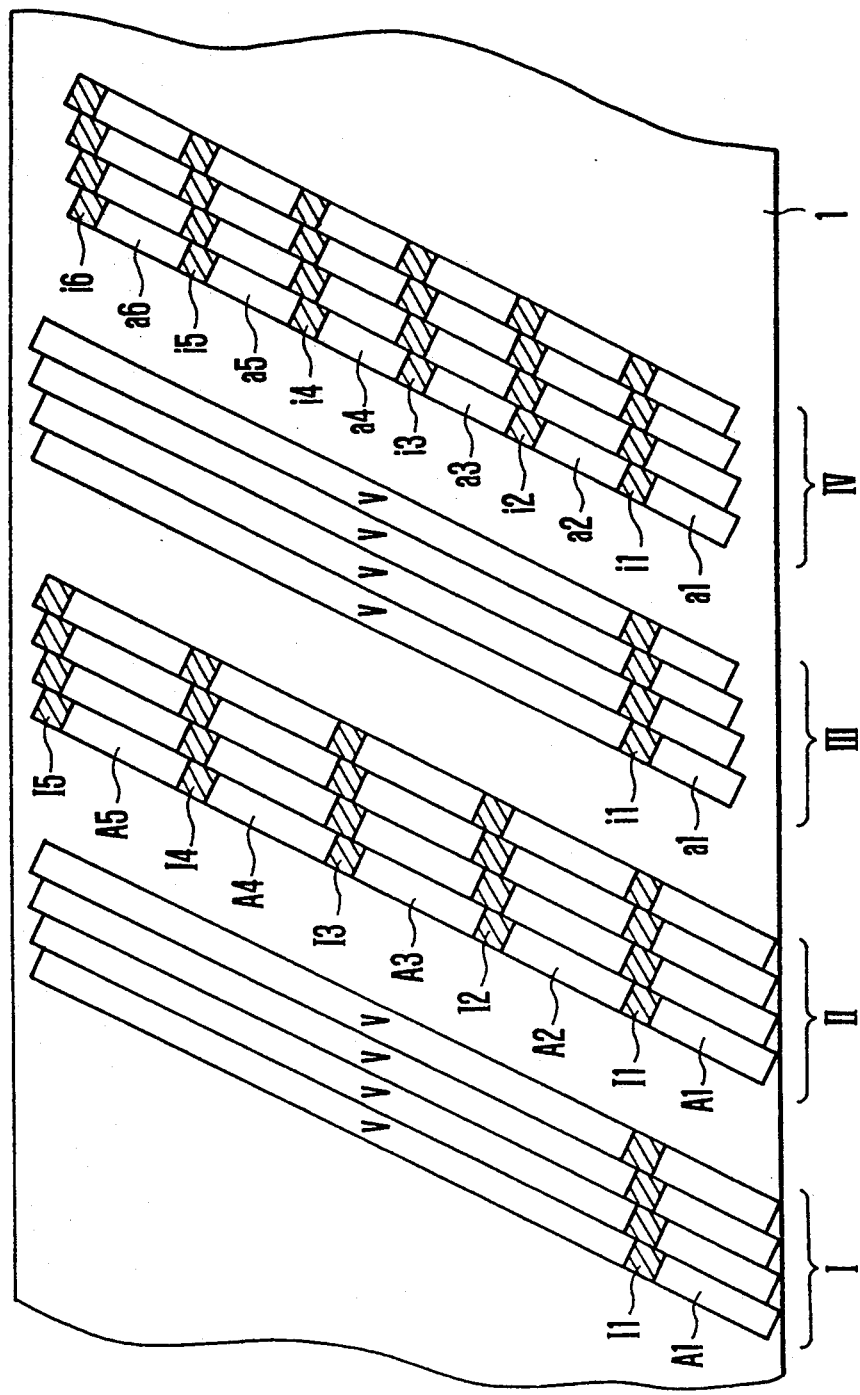
FIG. 2 shows a recording format in which signals are recorded on a tape by the VTR of FIG. 1.

The recording formats of the VTR of this embodiment are first described as follows: FIG. 2 shows the formats of record recorded on the tape 1 by the VTR of the embodiment. In the case of this VTR, four recording formats I, II, III and IV can be set as shown in FIG. 2. The illustration includes video signal recording areas V; recording areas A1 to A5 in which PCM audio signals in a high-definition mode are recorded respectively; recording areas a1 to a6 in which PCM audio signals in a normal mode are recorded respectively; recording areas I1 to I5 in which retrieval information in a high-definition mode is recorded respectively; and recording areas i1 to i5 in which retrieval information in a normal mode is recorded respectively. As shown, recording in the video areas V is performed in an unvarying format irrespectively of the normal PCM mode or the high-definition PCM mode. Further, the positions of the retrieval information recording areas I1 to i1 are also arranged to be unvarying.

FIGS. 3(a)-3(k) are timing charts showing the operation timing of each part of the VTR shown in FIG. 1. The operation of the VTR of this embodiment is as described below with reference to FIG. 3 as well as to FIGS. 1 and 2:

The operation performed in recording a video signal and an audio signal corresponding to the format I or III of FIG. 2 is first described.

A video signal coming through a terminal 20 is supplied to a video signal recording processing circuit 22. The video signal is then converted into a signal form suited for magnetic recording in a well known manner. The video signal thus processed by the circuit 22 is supplied to the terminals V of switches SW3 and SW4. The connecting positions of the switches SW3 and SW4 are on the side of their terminals V only when the heads Ha and Hb are tracing the video area V and are on the side of other terminals P while the heads are not tracing the video area V. This allows the video signal from the video signal recording processing circuit 22 to be recorded in the video area V of each of tracks formed on the tape 1. Assuming that the signal HSP (head change-over reference signal) output from the rotation phase detector 8 is at a high level while the head Ha is tracing the video area V and at a low level while the head Hb is tracing the video area V as shown at a part (a) in FIG. 3, the signal HSP is supplied as it is to the switch SW3 as a timing control signal tc6. To the switch SW4 is supplied another timing control signal tc7 which is obtained by inverting the signal HSP.

Meanwhile, an audio signal coming through an audio signal input terminal 24 is supplied to a PCM audio signal recording processing circuit (A) 26, a PCM audio signal recording processing circuit (B) 30 and an additional signal generating circuit 14. The PCM audio signal recording processing circuit (A) 26 is provided for processing in a high-definition mode and has its operating frequency determined by a clock signal output from a clock signal generating circuit (A) 32. For example, a sampling frequency for the audio signal to be processed by the audio signal recording processing circuit (A) 26 is set at a frequency 44.1 KHz. Then, the clock signal generating circuit (A) 32 is arranged to generate the clock signal at a frequency which is an integer times as high as 44.1 KHz. Further, the PCM audio signal recording processing circuit (B) 30 is provided for processing in a normal mode and has its operating frequency determined by a clock signal output from a clock signal generating circuit (B) 34. For example, a sampling frequency for the audio signal to be processed by the audio signal recording processing circuit (B) 30 is set at 31.5 KHz, and the frequency of a clock signal output from a clock signal generating circuit (B) 34 is set at a frequency which is an integer times as high as 31.5 KHz.

The output of the PCM audio signal recording processing circuit (A) 26 and that of the PCM audio signal recording processing circuit (B) 30 are respectively supplied to a switch SW7. The additional signal generating circuit 14 generates various retrieval control codes such as an index code, time code, etc., by detecting a mute part, etc., according to the audio signal supplied to the terminal 24. These control codes are also supplied to the switch SW7. In the case of the VTR of this embodiment, the additional signal generating circuit 14 is provided for both the high-definition mode and the normal mode in common. Since the operation frequency of the circuit 14 is lower than those of the PCM audio signal recording processing circuits, the operation frequency of the circuit 14 is determined by a clock signal output from a frequency divider 36 obtained by frequency-dividing the clock signal output from the clock signal generating circuit (B) 34 which determines the operation frequency of the PCM audio signal recording processing circuit (B) 30.

The recording modes I to IV and the PCM audio signal recording modes shown in FIG. 2 are arranged to be selectable by the operator by operating the operation part 11. With the operation part 11 operated, the system controller 10 generates a mode signal N/H which indicates either the normal mode or the high-definition mode. The mode signal N/H is supplied to a timing controller 5. The timing controller 5 then produces timing control signals tc1, tc2 and tc10 to control the operation timing of the PCM audio signal recording processing circuit (B) 30, the PCM audio signal recording processing circuit (A) 26 and the addition signal generating circuit 14.

Figure 3:
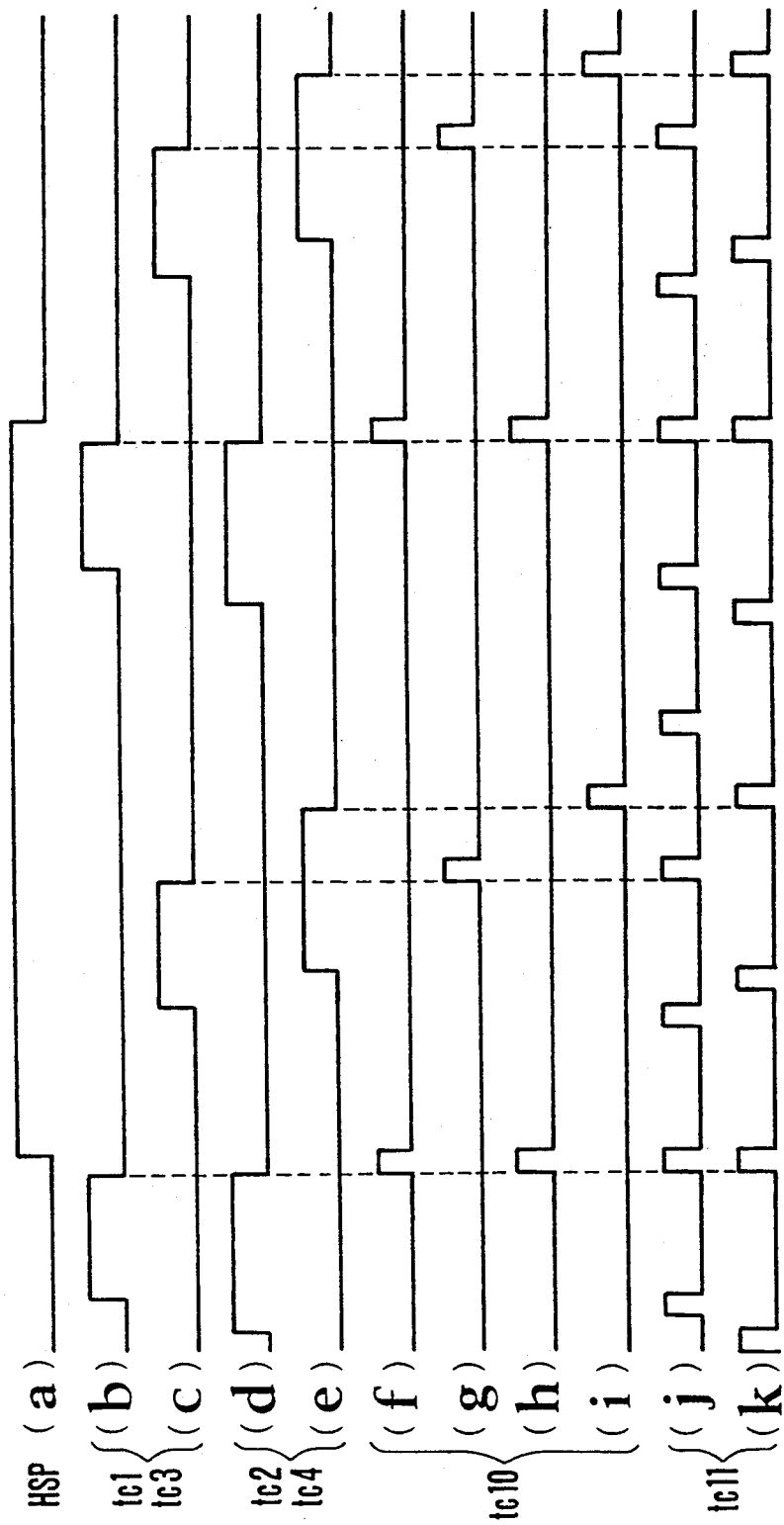
FIGS. 3(a)–3(k) is a timing chart showing the recording and reproducing actions of the VTR of FIG. 1.

In cases where the recording mode III or I is selected, the signal tc1 or tc2 is produced as shown at a part (b) or (d) in FIG. 3, respectively. When the recording mode III or I is selected, the signal tc10 is produced as shown at a part (f) or (h) in FIG. 3, respectively. In response to the timing control signal tc2 or tc1, the PCM audio signal recording processing circuit (A) 26 or the PCM audio signal recording processing circuit (B) 30 produces a PCM audio signal at the timing when the head Ha or Hb traces the PCM audio area A1 or a1. The timing control signal tc10 also causes the additional signal generating circuit 14 to generate the control codes at the timing when the head Ha or Hb traces the retrieval information recording area I1 or i1. The areas I1 and i1 are identical with each other. Therefore, when the recording mode is either the mode I or the mode III, the timing control signal tc10 is produced for both the high-definition mode and the normal mode.

The PCM audio signal recording processing circuit (A) 26 or the PCM audio signal recording processing circuit (B) 30 generates digital signals including the PCM audio signals while the head Ha or Hb rotates 41 or 36 degrees immediately before recording the video signal. One of these signals is selected by the switch SW7 according to a timing control signal tc5 and is supplied to an adder 18. Meanwhile, in accordance with the mode signal N/H, a pilot signal (fa) generating circuit 16 supplies the adder 18 with a pilot signal "fa" of a given low frequency which is low enough not to affect the PCM audio signal in a case where the PCM audio signal is to be recorded in the high-definition mode. The pilot signal "fa" is then multiplexed with the PCM audio signal by the adder 18. The signal output from the adder 18 is supplied to the terminals P of the switches SW3 and SW4. As a result, the switches SW3 and SW4 output recording signals including the video signal, the retrieval control code and the PCM audio signal. Meanwhile, the system controller 10 produces a recording/reproduction change-over signal R/P to cause the connecting positions of switches SW1 and SW2 to be on the side of their terminals R. This allows the PCM audio signal to be recorded in the PCM audio area A1 or a1 as shown in FIG. 2. Further, the retrieval control code is likewise recorded in the retrieval information recording area I1 or i1.

Next, in reproducing a video signal and an audio signal, the VTR operates as follows: upon receipt of an instruction for reproduction from the operation part 11, the system controller 10 brings the system into a reproducing state by producing the signal R/P to shift the connecting positions of the switches SW1 and SW2 to their terminals P for reproduction.

In initiating a reproducing action, the mode in which the PCM audio signal has been recorded on the tape 1 is unknown. In the case of this embodiment, therefore, the recording mode of the PCM audio signal is identified by the presence or absence of the above-stated pilot signal "fa" which is provided for the high-definition mode. Therefore, in the case of this embodiment, the tape 1 is first wound at least 221 degrees around the drum 2. Then, a check is made by means of an "fa" detecting circuit 19 to find whether the PCM audio signal has been recorded in the normal mode or in the high-definition mode. The "fa" detecting circuit 19 is connected to the terminals P of switches SW5 and SW6 and performs the identification of modes according to whether or not the pilot signal "fa" exists in the PCM audio area A1 or a1.

The system controller 10 receives the detection signal output from the "fa" detecting circuit 19 and generates the mode signal N/H accordingly. The mode signal N/H is supplied to the timing controller 5 and, at the same time, causes the connecting position of a switch SW8 to be shifted from one position over to another accordingly. The PCM audio signal reproduced by the head Ha or Hb is then output from the terminals P of the switches SW5 and SW6 under the control of the timing control signals tc8 and tc9. The signal is received by a PCM audio signal reproduction processing circuit (B) 38 or (A) 40 to be processed according to the timing control signal tc3 or tc4 in a manner reverse to the process performed by the PCM audio signal recording processing circuit (B) 30 or (A) 26. The reproduced audio signal which is thus processed is output from an audio signal output terminal 42 via the switch SW8. Meanwhile, the video signal which is output from the terminals V of the switches SW5 and SW6 is supplied to a video signal reproduction processing circuit 44 to be converted back to its original signal form which is, for example, a TV signal form by this circuit 44. The reproduced video signal which is thus processed is output from a video signal output terminal 46.

The timing control signal tc11 output from the timing controller 5 controls the operation of a gate circuit 6. As shown at parts (j) and (k) in FIG. 3, the control signal tc11 varies with the recording mode of the PCM audio signal. The timing control signal tc11 is in a form as shown at the part (j) of FIG. 3 in the recording mode IV and in a form as shown at the part (k) of FIG. 3 in the recording mode II. However, in cases where the video signal is to be also recorded, i.e., in the recording mode I or III, the gate timing of the gate circuit 6 remains unchanged as the retrieval information recording areas I1 and i1 are identical with each other as mentioned in the foregoing. Therefore, in the recording modes I or III, a gating action is performed according to the common parts of the signal forms of the timing control signal tc11 shown in the parts (j) and (k) of FIG. 3.

When a retrieval mode is designated by the operation part 11, the system controller 10 causes a capstan control circuit 17 to have the capstan 7 rotated at a high speed. This causes the tape 1 to be transported at a high speed. After that, when an additional signal extracting circuit 12 detects the leader part of a program on the basis of a detection control signal gated by the gate circuit 6, the system controller 10 brings the VTR into the reproduction mode described in the foregoing.

In a case where the VTR of this embodiment is arranged to be used only for audio signals, that is, in the event of recording in the recording format II or IV of FIG. 2, it performs recording as described below:

In this instance, the operation part 11 is operated to instruct the VTR to record the PCM audio signal in one of the areas A1 to A5 or one of the areas a1 to a6. In response to this, the timing controller 5 produces the timing control signals tc2, tc1, tc5 and tc10. The positions of the switches SW3 and SW4 are fixed on the side of their terminals P. For example, with the area a3 designated as a recording area for the PCM audio signal in the normal mode, the timing control signal tc1 becomes as shown at a part (c) in FIG. 3. Then, the PCM audio signal is recorded in the area a3. Further, the timing control signal tc10 then becomes as shown at a part (g) in FIG. 3 and the retrieval control code is recorded in the area i3. Further, if the area A3 is designated as a recording area for the PCM audio signal in the high-definition mode, the timing control signal tc2 becomes as shown at a part (e) in FIG. 3 and the PCM audio signal in the high-definition mode is recorded in the area A3. Then, the timing control signal tc10 becomes as shown at a part (i) in FIG. 3 and the retrieval control code is recorded in the area I3.

The reproducing operation in this instance is also performed in a manner similar to the above operation. The positions of the switches SW5 and SW6 remain on the side of their terminals P. A record within the area designated by the operation part 11 is reproduced. More specifically, the timing control signals tc3 and tc4 to be used for reproduction of the records of the areas a3 and A3 become as shown at parts (c) and (e) in FIG. 3. Meanwhile, the gate circuit 6 is controlled by the timing signal tc11 which is shown at the parts (j) and (k) of FIG. 3. This makes all the retrieval control signal records in the retrieval information recording areas i1 to i6 and I1 to I5 reproducible. Therefore, in performing a retrieving action, with the retrieval information records in all the areas arranged to be valid, the retrieving action can be accomplished to permit reproduction of any program record as desired. For example, a program recorded in the nearest part can be reproduced. It is also possible to permit reproduction of a program located next to a designated area by making valid only a retrieval signal related to the audio signal of the designated area.

The arrangement of this embodiment described gives the following advantages to the VTR of the kind having various PCM audio signal recording and reproducing modes: although the recording or reproduction processing circuits have different operation frequencies, a single retrieval-control-code-recording or -extracting circuit can be arranged to permit recording of a retrieval signal in each of various modes and a retrieving action by using the retrieval signal recorded. Therefore, the scale of the necessary circuit arrangement can be reduced to a great degree. Further, the clock signal to be used by the retrieval control code generating circuit or the retrieval control code extracting circuit is arranged to be obtained by frequency-dividing a clock signal which is used for determining the operation frequency of one of the audio signal processing circuits provided for the different modes. This obviates the necessity of newly generating another clock signal.

Further, in the case of this embodiment, the PCM audio signal recording mode is detected by the presence or absence of the identifying pilot signal "fa". However, the mode of course can be likewise detected by the presence or absence of a carrier of the PCM audio signal in a given part of each track.

In accordance with this invention, as described in the foregoing, the apparatus of the kind recording and/or reproducing a plurality of kinds of digital main information having different data rates from each other can be arranged to be capable of recording additional information with a compact circuit arrangement, so that the size and cost of the apparatus can be minimized.

What is claimed is:
1. A digital signal recording apparatus comprising:
   a) a plurality of main information generating circuits for generating a plurality of kinds of digital main information signals having different data rates from each other;
   b) recording means for selectively recording said plurality of kinds of digital main information signals on a recording medium at different recording data rates, respectively;
   c) an additional information generating circuit for generating a digital additional information signal concerned with the digital main information signal recorded by said recording means;
   d) a plurality of clock signal generating circuits for respectively generating a plurality of kinds of clock signals, wherein said main information generating circuits generate said main information signals by using the clock signals generated by said plurality of kinds of clock signal generating circuits; and
   e) frequency dividing means for generating a clock signal to be used for said additional information generating circuit by frequency-dividing one of said plurality of kinds of clock signals.

2. An apparatus according to claim 1, further comprising audio input means for receiving an audio signal, and wherein the audio signal received by said audio input means is supplied to each of said plurality of main information generating circuits.

3. An apparatus according to claim 2, further comprising video signal generating means for generating a video signal, and wherein said recording means is arranged to record the selected digital main information signal, the digital additional information signal and the video signal on the recording medium in a time sharing manner.

4. An apparatus according to claim 1, wherein said recording means is arranged to change a recording position of the digital additional information signal according to which of said plurality of kinds of digital main information signals is recorded.

5. An apparatus according to claim 4, further comprising an identification signal generating circuit for generating an identification signal for indicating the kind of the digital main information signal selected to be recorded, and wherein said recording means is arranged to record the selected digital main information signal, the digital additional information signal and the identification signal on the recording medium.

6. A digital signal recording apparatus comprising:
   a) first and second main information generating circuits for generating first and second digital main information signals having different data rates from each other;
   b) an additional information generating circuit for generating a digital additional information signal;
   c) recording means for recording signals on a recording medium; and
   d) mode change-over means for changing one mode over to another among a plurality of modes of said apparatus, said plurality of modes including a first mode in which said recording means records said first digital main information signal and said digital additional information signal and a second mode in which said recording means records said second digital main information signal and said digital additional information signal, and wherein said recording means records said first and second digital main information signals at different data rates, respectively.

7. An apparatus according to claim 6, further comprising first and second clock signal generating circuits for generating first and second clock signals for operating said first and second main information generating circuits, and wherein said additional information generating circuit is arranged to operate in accordance with said first clock signal in both said first and second modes.

8. An apparatus according to claim 7, further comprising frequency dividing means for generating, by frequency-dividing said first clock signal, a clock signal for operating said additional information generating circuit.

9. A reproducing apparatus for reproducing, from a recording medium on which a plurality of kinds of digital main information signals having different data rates from each other are selectively recorded at different recording data rates, respectively, and on which a digital additional information signal concerned with the recorded digital main information signal is recorded, the digital main information signals, said apparatus comprising:
a) reproducing means for reproducing the digital main information signals from the recording medium at different data rates, respectively;
b) a plurality of main information processing circuits arranged to receive signals reproduced by said reproducing means and to process the plurality of kinds of digital main information signals, respectively;
c) an additional information processing circuit arranged to receive the signals reproduced by said reproducing means and to reproduce said digital additional information signal;
d) a plurality of clock signal generating circuits for respectively generating a plurality of kinds of clock signals, wherein said main information processing circuit processes said digital main information signals by using the clock signals generated by said clock signal generating circuits, respectively; and
e) frequency dividing means for generating a clock signal to be used for said additional information processing circuit by frequency-dividing one of the plurality of kinds of clock signals.

10. An apparatus according to claim 9, wherein an identification signal indicating the kind of the recorded digital main information signal is recorded on the recording medium, said apparatus further comprising an identification signal separation circuit arranged to receive the signals reproduced by said reproducing means and to separate said identification signal from the reproduced signals.

11. An apparatus according to claim 10, further comprising a switching circuit for selectively outputting outputs of said plurality of main information processing circuits in accordance with said identification signal separated by said identification signal separation circuit.

12. An apparatus according to claim 10, wherein a recording position of said digital additional information signal varies according to which of said plurality of kinds of digital main information signals is recorded, and wherein said additional information processing circuit includes a gate circuit arranged to receive the signals reproduced by said reproducing means and to change its gating timing according to said identification signal.

13. An apparatus according to claim 9, wherein said recording medium is a tape-shaped recording medium, said apparatus further comprising transport means for transporting said tape-shaped recording medium in its lengthwise direction, and transport control means for controlling a transporting action of said transport means in accordance with said digital additional information signal reproduced by said additional information processing circuit.

14. A reproducing apparatus for reproducing, from a tape-shaped recording medium on which first and second digital main information signals having different data rates from each other are selectively recorded at different recording rates, respectively, and on which a digital additional information signal concerned with the recorded digital main information signal is recorded, said first or second digital main information signal, said apparatus comprising:
a) reproducing means for reproducing signals from the recording medium at different data rates, respectively;
b) transport means for transporting said tape-shaped recording medium in its lengthwise direction;
c) first and second main information processing circuits arranged to receive signals reproduced by said reproducing means and to process respectively said first and second digital main information signals;
d) a switching circuit for selectively outputting outputs of said first and second main information processing circuits;
e) an additional information processing circuit arranged to receive the signals reproduced by said reproducing means and to reproduce said digital additional information signal; and
f) mode change-over means for changing one mode over to another among a plurality of modes of said apparatus, said plurality of modes including a first mode in which said switching circuit outputs said first digital main information signal and a second mode in which said switching circuit outputs said second digital main information signal, said transport means being arranged to operate according to an output of said additional information processing circuit in both said first and second modes.

15. An apparatus according to claim 14, further comprising first and second clock signal generating circuits for generating first and second clock signals for operating said first and second main information processing circuits, and wherein said additional information processing circuit is arranged to operate in accordance with said first clock signal in both said first and second modes.

16. An apparatus according to claim 15, further comprising frequency dividing means for frequency-dividing said first clock signal to generate a clock signal for operating said additional information processing circuit.

17. An apparatus according to claim 10, wherein a recording timing of said additional information processing circuit is different, depending upon which signal among said plurality of kinds of digital information signals is recorded, and said additional information processing circuit having a gate circuit which receives the signal reproduced by said reproducing means and changes over the gate timing in accordance with said identification signal.

* * * * *